United States Patent
Upadhyay et al.

(10) Patent No.: US 11,372,726 B2
(45) Date of Patent: Jun. 28, 2022

(54) METHOD AND SYSTEM FOR ADAPTIVE INCREMENTALLY UPDATED BACKUPS WITH DYNAMIC DATA FILE DETECTION

(71) Applicant: EMC IP Holding Company LLC, Hopkinton, MA (US)

(72) Inventors: Navneet Upadhyay, Ghaziabad (IN); Shraddha Chunekar, Indore (IN); Rejith Mohan M, Benaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 235 days.

(21) Appl. No.: 16/782,104

(22) Filed: Feb. 5, 2020

(65) Prior Publication Data

US 2021/0240573 A1 Aug. 5, 2021

(51) Int. Cl.
*G06F 16/00* (2019.01)
*G06F 11/14* (2006.01)
*G06F 16/16* (2019.01)

(52) U.S. Cl.
CPC ........ *G06F 11/1458* (2013.01); *G06F 16/162* (2019.01); *G06F 2201/84* (2013.01)

(58) Field of Classification Search
CPC . G06F 11/1458; G06F 16/162; G06F 2201/84

USPC .......................................................... 707/645
See application file for complete search history.

(56) References Cited

U.S. PATENT DOCUMENTS

| | | | | |
|---|---|---|---|---|
| 8,655,841 | B1* | 2/2014 | Sridharan | G06F 11/1461 |
| | | | | 707/625 |
| 9,424,137 | B1* | 8/2016 | Mam | G06F 11/1451 |
| 9,946,603 | B1* | 4/2018 | Kumar | G06F 11/3079 |
| 10,802,919 | B1* | 10/2020 | Wolfson | G06F 11/1471 |
| 2008/0133828 | A1* | 6/2008 | Saito | G06F 11/1451 |
| | | | | 711/111 |
| 2016/0004599 | A1* | 1/2016 | Mam | G06F 3/0683 |
| | | | | 711/103 |
| 2016/0314046 | A1* | 10/2016 | Kumarasamy | G06F 11/1451 |

* cited by examiner

*Primary Examiner* — Monica M Pyo
(74) *Attorney, Agent, or Firm* — Chamberlain, Hrdlicka, White, Williams & Aughtry

(57) ABSTRACT

In general, the invention relates to a method for performing backup operations. The method includes generating a full backup of a user asset at a first point in time, generating an incremental backup after the full backup is generated, applying the incremental backup to the full backup to generate a second full backup, obtaining a distinct data files subset associated with the second full backup, and deleting the distinct data files subset from the second full backup to obtain a third full backup.

8 Claims, 10 Drawing Sheets

METHOD AND SYSTEM FOR ADAPTIVE INCREMENTALLY UPDATED BACKUPS WITH DYNAMIC DATA FILE DETECTION

BACKGROUND

Database protection defines the process of protecting database data using a secondary storage. More specifically, protection of the database data often entails replicating database data, sending the replicated data to a secondary storage across a network, and storing the replicated data on the secondary storage.

SUMMARY

In general, in one aspect, the invention relates to a method for performing backup operations. The method includes generating a full backup of a user asset at a first point in time, generating an incremental backup after the full backup is generated, applying the incremental backup to the full backup to generate a second full backup, obtaining a distinct data files subset associated with the second full backup, and deleting the distinct data files subset from the second full backup to obtain a third full backup.

In general, in one aspect, the invention relates to a system that includes a processor and a client protection agent, which when executed by the processor performs a method. The method includes generating a full backup of a user asset at a first point in time, generating an incremental backup after the full backup is generated, applying the incremental backup to the full backup to generate a second full backup, obtaining a distinct data files subset associated with the second full backup, and deleting the distinct data files subset from the second full backup to obtain a third full backup.

In general, in one aspect, the invention relates to a non-transitory computer readable medium which includes computer readable program code, which when executed by a computer processor enables the computer processor to perform a method. The method includes generating a full backup of a user asset at a first point in time, generating an incremental backup after the full backup is generated, applying the incremental backup to the full backup to generate a second full backup, obtaining a distinct data files subset associated with the second full backup, and deleting the distinct data files subset from the second full backup to obtain a third full backup.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for adaptively updating incremental backups using dynamic data file detection. Specifically, one or more embodiments of the inventions enables the ability to perform incremental backup operations of database data in which data files have been deleted or added since a prior full backup of the database data. The dynamic data file detection for incremental backup operations provides mechanisms through which data files added to a client database may also be added to backup database associated with the client database in a backup storage system, and data files deleted in a client database may also be deleted on a backup database associated with the client database in a backup storage system during an incremental backup operation without the need to perform another full backup operation.

Figure 1A:
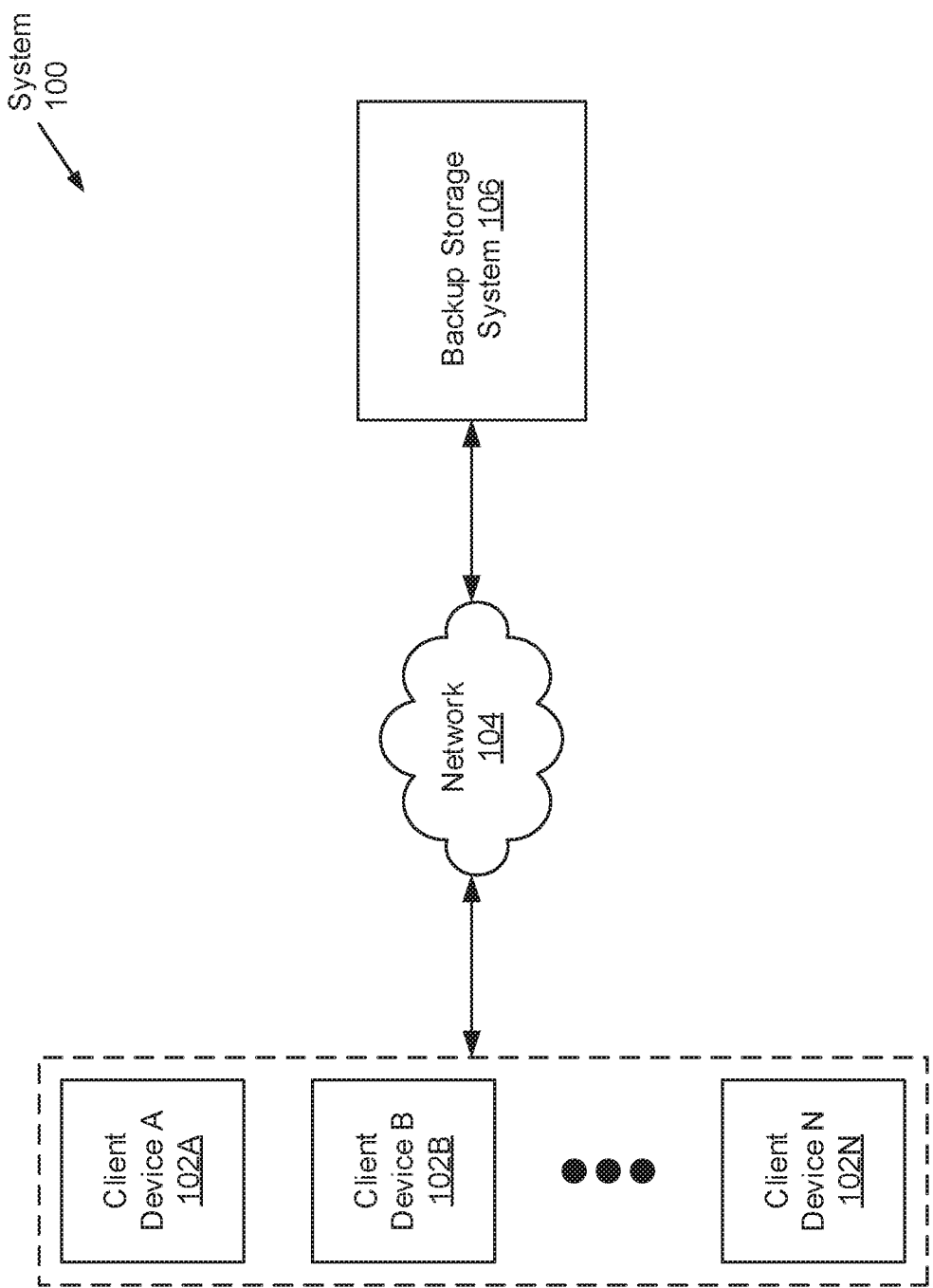
FIG. 1A shows a system in accordance with one or more embodiments of the invention.

FIG. 1A shows a system in accordance with one or more embodiments of the invention. The system (100) may include one or more client devices (102A-102N) operatively connected to a backup storage system (106). Each of these system (100) components is described below.

In one embodiment of the invention, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical appliance or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a server, a mainframe, or any other computing system similar to the exemplary computing system shown in FIG. 5. Moreover, client devices (102A-102N) are described in further detail below with respect to FIG. 1B.

In one embodiment of the invention, the backup storage system (106) may represent a data backup, archiving, and/or disaster recovery storage system. The backup storage system (106) may be implemented using one or more servers (not shown). Each server may refer to a physical server, which may reside in a datacenter, or a virtual server, which may reside in a cloud computing environment. Additionally or alternatively, the backup storage system (106) may be implemented using one or more computing systems similar to the exemplary computing system shown in FIG. 5. Furthermore, the backup storage system (106) is described in further detail below with respect to FIG. 1C.

While FIG. 1A shows a configuration of components, other system (100) configurations may be used without departing from the scope of the invention.

Figure 1B:
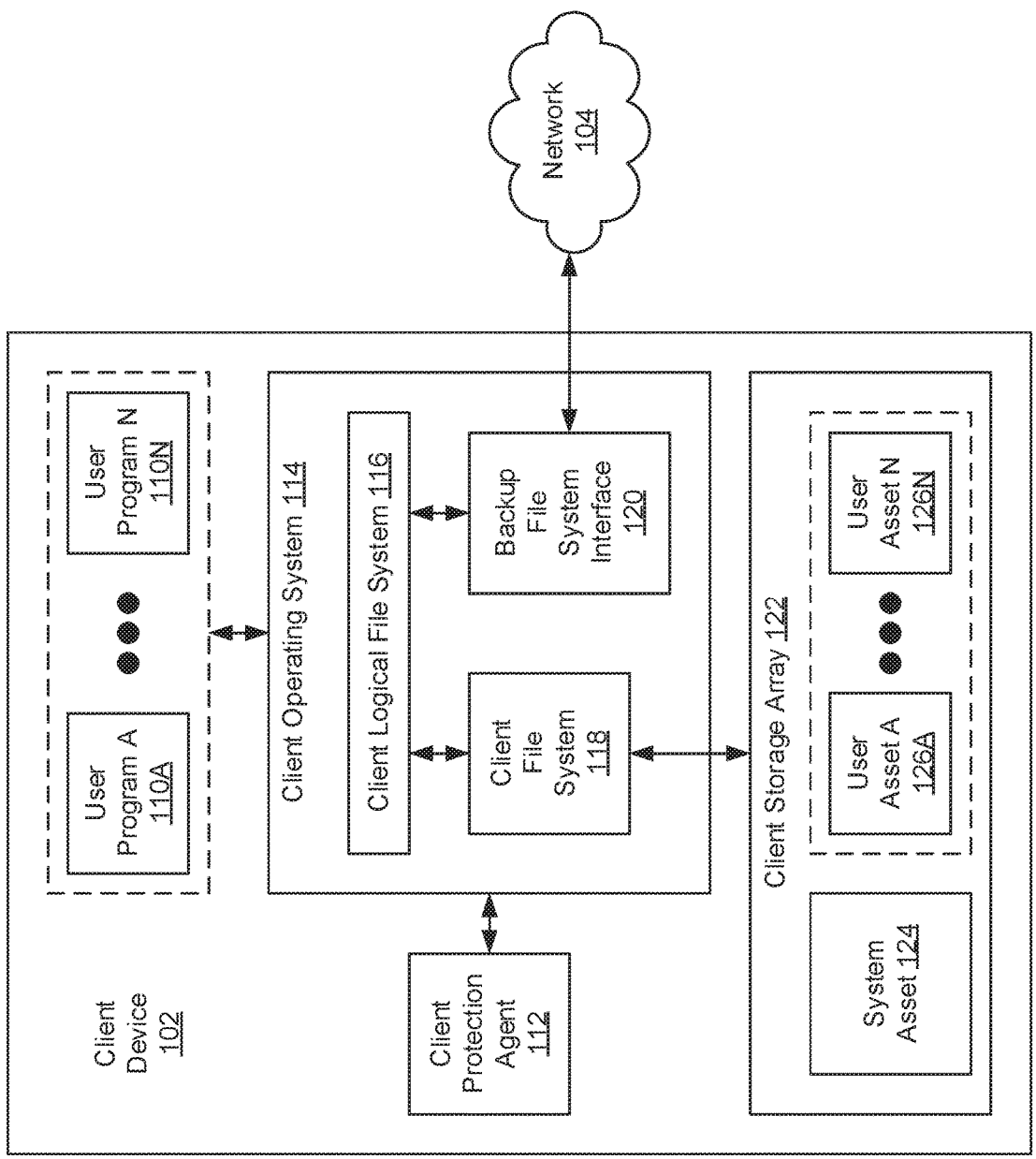
FIG. 1B shows a client device in accordance with one or more embodiments of the invention.

FIG. 1B shows a client device in accordance with one or more embodiments of the invention. The client device (102) may include one or more user programs (110A-110N), a client protection agent (112), a client operating system (114), and a client storage array (122). Each of these client device (102) components is described below.

In one embodiment of the invention, a user program (110A-110N) may refer to a computer program that may execute on the underlying hardware of the client device (102). Specifically, a user program (110A-110N) may be designed and configured to perform one or more functions, tasks, and/or activities instantiated by a user of the client device (102). Accordingly, towards performing these operations, a user program (110A-110N) may include functionality to request and consume client device (102) resources (e.g., computer processors, memory, storage (122), virtualization, network bandwidth, etc.) by way of service calls to the client operating system (114). One of ordinary skill will appreciate that a user program (110A-110N) may perform other functionalities without departing from the scope of the invention. Examples of a user program (110A-110N) may include, but are not limited to, a word processor, an email client, a database client, a web browser, a media player, a file viewer, an image editor, a simulator, a computer game, or any other computer executable application.

In one embodiment of the invention, the client protection agent (112) may refer to a computer program that may execute on the underlying hardware of the client device (102). Specifically, the client protection agent (112) may be designed and configured to perform client-side database backup and recovery operations. To that extent, the client protection agent (112) may protect one or more databases (also referred herein as assets (126A-126N)) on the client device (102) against data loss (i.e., backup the database(s)); and reconstruct one or more databases on the client device (102) following such data loss (i.e., recover the database(s)). One of ordinary skill will appreciate that the client protection agent (112) may perform other functionalities without departing from the scope of the invention.

In one embodiment of the invention, the client operating system (114) may refer to a computer program that may execute on the underlying hardware of the client device (102). Specifically, the client operating system (114) may be designed and configured to oversee client device (102) operations. To that extent, the client operating system (114) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (114) may perform other functionalities without departing from the scope of the invention.

For example, the client operating system (114) may facilitate user program (110A-110N) interaction with user asset (126A-126N) data stored locally on the client device (102) or remotely over the network (104). In facilitating the aforementioned interaction, the client operating system (114) may implement a client logical file system (116). The client logical file system (116) may represent a collection of in-memory data structures maintained, by the client operating system (114), to manage the various accessible user asset (126A-126N) data stored locally on the client device (102) and/or remotely on the backup storage system (106). Further, the client logical file system (116) may expose an application programming interface (API) through which the user program(s) (110A-110N) may manipulate—i.e., via one or more file operations—any granularity of locally and/or remotely stored user asset (126A-126N) data. These file operations, requested by the user program(s) (110A-110N), may subsequently be delivered to the client file system (118) or backup file system interface (120) for processing.

In one embodiment of the invention, the client file system (118) may represent a physical file system (also referred to as a file system implementation). A physical file system may refer to a collection of subroutines concerned with the physical operation of one or more physical storage devices (described below). The client file system (118), in this respect, may be concerned with the physical operation of the client storage array (122). Accordingly, the client file system (118) may employ client storage array (122) device drivers (or firmware) (not shown) to process requested file operations from the user program(s) (110A-110N). Device drivers enable the client file system (118) to manipulate physical storage or disk blocks as appropriate.

In one embodiment of the invention, the backup file system interface (120) may represent a computer program that may execute on the underlying hardware of the client device (102). Specifically, the backup file system interface (120) may be designed and configured to facilitate the access and manipulation of remotely stored database data as if the aforementioned database data were stored locally on the client device (102). Accordingly, the backup file system interface (120) may, in part, implement a distributed file system (DFS), which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device (102)) across the network (104). Furthermore, the backup file system interface (120) may include functionality to issue remote procedure calls (RPCs) directed to accessing and manipulating any granularity of database data remotely stored on the backup storage system (106). The invention is not limited to the aforementioned protocols.

In one embodiment of the invention, the client storage array (122) may refer to a collection of one or more physical storage devices (not shown) on which various forms of digital data—e.g., a system asset (124) and one or more user assets (126A-126N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (122) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a system asset (124) may represent a database, or a logical container to and from which related digital data, or any granularity thereof, may be stored and retrieved, respectively. A system asset (124) may occupy a portion of a physical storage device or, alternatively, may span across multiple physical storage devices, of the client storage array (122). Furthermore, a system asset (124) may refer to a composite of various database objects including, but not limited to, one or more recovery catalogs (not shown, discussed below).

In one embodiment of the invention, a recovery catalog may refer to a database object that stores backup operation metadata. The recovery catalog may include entries for one or more backup operations. The recovery catalog entries may include metadata that includes information regarding successfully backed-up data files for a backup operation. The metadata may include data file identifiers, user asset identifiers, data file storage locations, and/or other types of metadata without departing from the scope of the invention.

In one embodiment of the invention, an user asset (126A-126N) may represent a database, or a logical container to and from which related digital data, or any granularity thereof, may be stored and retrieved, respectively. An user asset (126A-126N) may occupy a portion of a physical storage device or, alternatively, may span across multiple physical storage devices, of the client storage array (122). Furthermore, an user asset (126A-126N) may refer to a composite of various database objects including, but not limited to, one or more data files, one or more control files (all not shown). Each of these user asset (126A-126N) subcomponents is described below.

In one embodiment of the invention, a data file may refer to a database object that stores database data. Database data may encompass computer readable content (e.g., images, text, video, audio, machine code, any other form of computer readable content, or a combination thereof), which may be generated, interpreted, and/or processed by any given user program (110A-110N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information found throughout the undeduplicated computer readable content and, accordingly, may instead reflect a content recipe of the undeduplicated computer readable content. A content recipe may refer to a sequence of chunk identifiers (or pointers) associated with (or directed to) unique database data chunks consolidated in physical storage. Collectively, the sequence of chunk identifiers (or pointers)—representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a control file may refer to a database object that stores user asset (126A-126N) metadata (also referred to as database metadata). Database metadata may encompass information descriptive of the database (or user asset (126A-126N)) status and structure. By way of examples, database metadata may include, but are not limited to, a database name assigned to the user asset (126A-126N), the name(s) and storage location(s) of one or more data files and redo log files associated with the user asset (126A-126N), a creation timestamp encoding the date and/or time marking the creation of the user asset (126A-126N), a log sequence number associated with a current redo log file, etc.

While FIG. 1B shows a configuration of components, other client device (102) configurations may be used without departing from the scope of the invention.

Figure 1C:
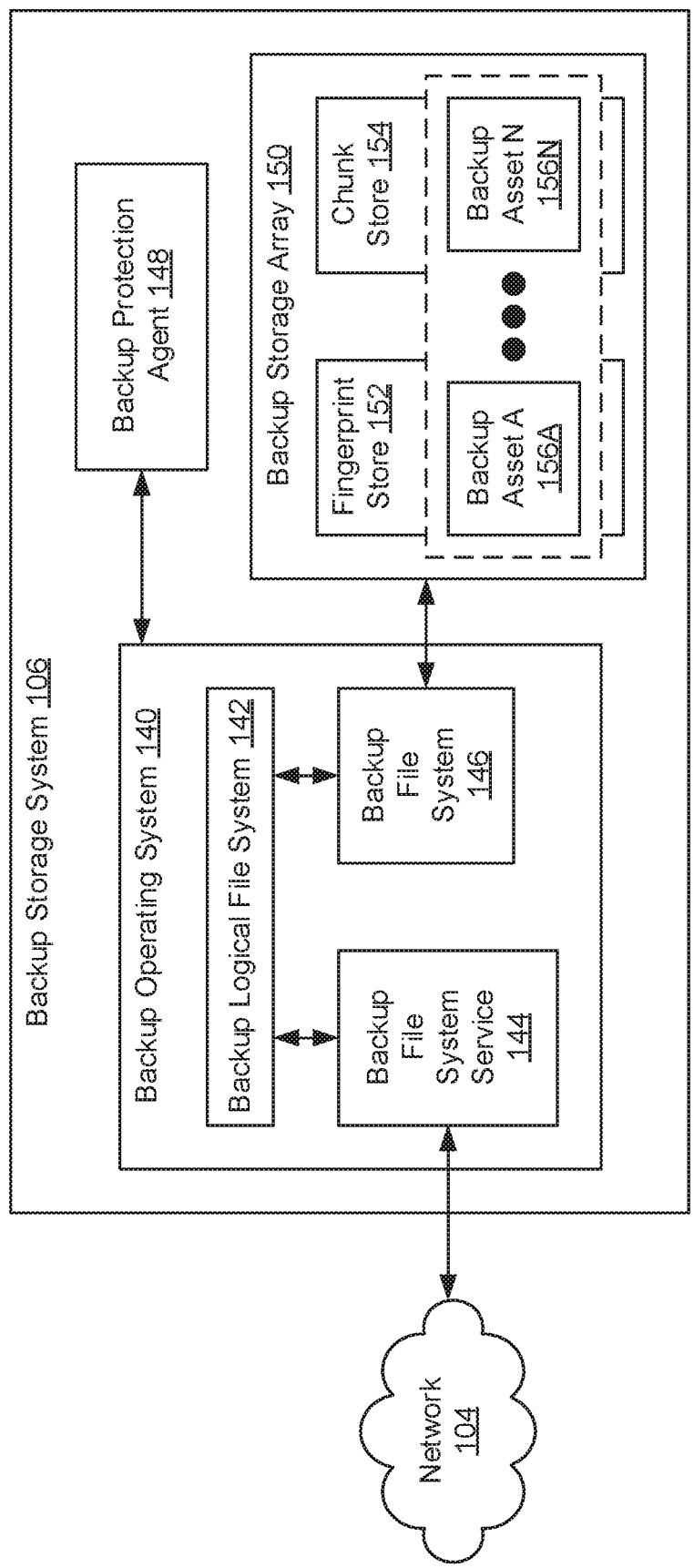
FIG. 1C shows a backup storage system in accordance with one or more embodiments of the invention.

FIG. 1C shows a backup storage system in accordance with one or more embodiments of the invention. The backup storage system (106) may include a backup operating system (140), a backup protection agent (148), and a backup storage array (150). Each of these backup storage system (106) components is described below.

In one embodiment of the invention, the backup operating system (140) may refer to a computer program that may execute on the underlying hardware of the backup storage system (106). Specifically, the backup operating system (140) may be designed and configured to oversee backup storage system (106) operations. To that extent, the backup operating system (140) may include functionality to, for example, support fundamental backup storage system (106) functions; schedule tasks; mediate interactivity between logical (e.g., software) and physical (e.g., hardware) backup storage system (106) components; allocate backup storage system (106) resources; and execute or invoke other computer programs executing on the backup storage system (106). One of ordinary skill will appreciate that the backup operating system (140) may perform other functionalities without departing from the scope of the invention.

For example, the backup operating system (140) may facilitate backup asset (156A-156N) access and manipulation by one or more computer programs (e.g., backup protection agent (148)) executing locally on the backup storage system (106) or, alternatively, by one or more remote computing systems (e.g., client device(s) (102A-102N)) over the network (104). In facilitating the aforementioned interaction, the backup operating system (140) may implement a backup logical file system (142). The backup logical file system (142) may represent a collection of in-memory data structures maintained, by the backup operating system (140), to manage the various accessible backup asset (156A-156N) data stored locally on the backup storage system (106). Further, the backup logical file system (142) may expose an application programming interface (API) through which the local computer programs and/or remote computing systems may manipulate—i.e., via one or more file operations—any granularity of locally stored backup asset (156A-156N) data. File operations, requested by the local computer programs, may be delivered to the backup file system (146) for processing, whereas file operations, requested by the remote computing systems, may be received and processed by the backup file system service (144). Furthermore, the backup logical file system (142) is described in further detail below with respect to FIG. 1D.

In one embodiment of the invention, the backup file system service (144) may represent a computer program that may execute on the underlying hardware of the backup storage system (106). Specifically, the backup file system service (144) may be designed and configured to facilitate the authorized, remote access and manipulation of locally stored backup database data. Accordingly, the backup file system service (144) may, in part, implement a DFS (DFS), which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device(s) (102A-102N)) across the network (104). Furthermore, the backup file system service (144) may include functionality to service remote procedure calls (RPCs) directed to accessing and manipulating any granularity of backup database data locally stored on the backup storage system (106). The invention is not limited to the aforementioned protocols.

In one embodiment of the invention, the backup file system (146) may represent a physical file system (also referred to as a file system implementation). A physical file system may refer to a collection of subroutines concerned with the physical operation of one or more physical storage devices (described below). The backup file system (146), in this respect, may be concerned with the physical operation of the backup storage array (150). Accordingly, the backup file system (146) may employ backup storage array (150) device drivers (or firmware) (not shown) to process requested file operations from the local computer programs or the remote computing systems (via the backup file system service (144)). Device drivers enable the backup file system (146) to manipulate physical storage or disk blocks as appropriate.

In one embodiment of the invention, the backup protection agent (148) may refer to a computer program that may execute on the underlying hardware of the backup storage system (106). Specifically, the backup protection agent (148) may be designed and configured to perform server-side database backup and recovery operations. To that extent, the backup protection agent (148) may receive database data, submitted by the client device(s) (102A-102N), to store as backup assets (156A-156N) on the backup storage array (150) during database backup operations; and, conversely, may retrieve backup database data from the backup storage array (150) during database recovery operations. One of ordinary skill will appreciate that the backup protection agent (148) may perform other functionalities without departing from the scope of the invention.

In one embodiment of the invention, the backup storage array (150) may refer to a collection of one or more physical storage devices (not shown) on which various forms of digital data—e.g., one or more backup assets (156A-156N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (150) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (150) may include a fingerprint store (152) and a chunk store (154), which may collectively include deduplicated database data. Recall from above (see e.g., FIG. 1B), that deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (154) and the fingerprint store (152), respectively.

In one embodiment of the invention, the fingerprint store (152) may represent a repository for maintaining chunk identifiers. Each chunk identifier may be indexed by way of a fingerprint store (152) entry (not shown), which may store a mapping relating the chunk identifier to a storage identifier. A chunk identifier (also referred to as a fingerprint or hash) may represent a digital signature that uniquely identifies an associated database data chunk. Further, a chunk identifier may be produced by submitting the associated database data chunk through a hash function, which may employ any existing cryptographic mapping algorithm. As such, a chunk identifier may be outputted by the hash function given the associated database data chunk as input. Meanwhile, a storage identifier may represent a character or bit string that uniquely identifies a storage location in the backup storage array (150). By way of an example, a storage identifier may encompass a tuple reflecting (a) a storage device identifier uniquely assigned to a given physical storage device (not shown) of the backup storage array (150); and (b) a binary address assigned to a starting byte (or storage block) in the given physical storage device at which the database data chunk may be physically stored.

On the other hand, in one embodiment of the invention, the chunk store (154) may represent a repository for maintaining unique database data chunks. Each unique database data chunk may be indexed by way of a chunk store (154) entry (not shown), which may store a mapping relating a storage identifier (described above) to the unique database data chunk. A database data chunk may refer to a fragment or a partition of deduplicated database data. More specifically, a database data chunk may capture a unique byte pattern that may occur or recur throughout the undeduplicated database data.

In one embodiment of the invention, a backup asset (156A-156N) may refer to a deduplicated backup copy of a given asset (126A-126N) (see e.g., FIG. 1B). For example, a backup asset (156A-156N) may represent a database, or a logical container to and from which related digital data, or any granularity thereof, may be stored and retrieved, respectively. A backup asset (156A-156N) may occupy a portion of a physical storage device or, alternatively, may span across multiple physical storage devices, of the backup storage array (150). Furthermore, a backup asset (156A-156N) may include a combination of various database objects including, but not limited to, one or more data files, and one or more control files (described above).

While FIG. 1C shows a configuration of components, other backup storage system (106) configurations may be used without departing from the scope of the invention.

Figure 1D:
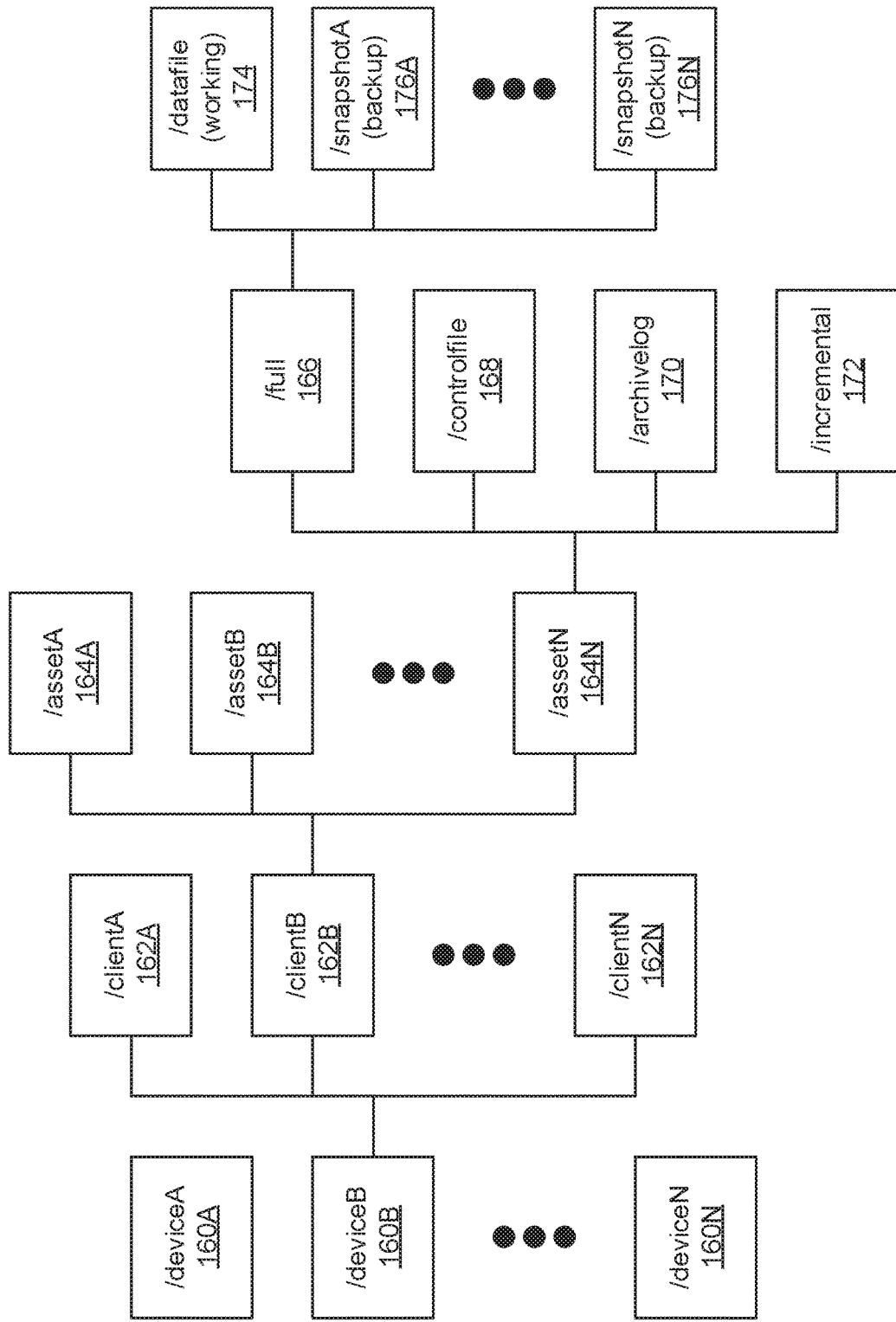
FIG. 1D shows a backup logical file system in accordance with one or more embodiments of the invention.

FIG. 1D shows a backup logical file system in accordance with one or more embodiments of the invention. A backup logical file system (142) may include one or more directories. In one embodiment of invention, a directory may be a file system cataloguing structure which includes references to other data files and/or other directories. Files may be organized by storing related files in the same directory. The backup logical file system (142) may include one or more directory hierarchies. In other words, there may be one or more directories that include subdirectories, (i.e., directories inside directories).

The backup logical file system (142) may include one or more storage device directories (i.e., /deviceA-/deviceN (160A-160N)). Each storage device directory (160A-160N) may include one or more client device directories (i.e., /clientA-/clientN (162A-162N)). Each client device directory (162A-162N) may include one or more asset directories (i.e., /assetA-/assetN (164A-164N)). Each asset directory (164A-164N) may include a full backup directory (i.e., /full (166)), a control file directory (i.e., /controlfile (168)), an archive log directory (i.e., /archivelog (170)), and an incremental backup directory (i.e., /incremental (172)). The full backup directory (166) may include a data file directory, or working directory, (i.e., /datafile (174)), and one or more snapshot, or backup, directories (i.e., /snapshotA-/snapshot (176A-176N)). Each directory and subdirectory is discussed below.

In one embodiment of the invention, a device directory (160A-160N) may refer to a directory that includes all of the backup data stored on a storage device of the backup storage system (106). As discussed above, the backup storage system (106) may include one or more servers or computing devices. A device directory (160A-160N) may include all of the backup data stored on a server or computing device including backup data from one or more client devices (102A-102N) and one or more user assets (126A-126N).

In one embodiment of the invention, a client directory (162A-162N) may refer to a directory that includes all of the backup data stored on a storage device of the backup storage system (106) that is associated with a particular client device (102A-102N). As discussed above, there may be one or more client devices (102A-102N) that store backup data into the backup storage system. The backup data stored in a client directory may be associated with one or more user assets (126A-126N) on the client device associated with the client directory (162A-162N).

In one embodiment of the invention, an asset directory (164A-164N) may refer to a directory that includes all backup data associated with a particular user asset (126A-126N). As discussed above, there may be one or more user assets (126A-126N) from which backup data is stored in the backup storage system (106).

In one embodiment of the invention, a full backup directory (166) may refer to a directory that includes all data associated with full image backups. A full backup directory my include a data file directory (174) (also referred to as a working directory) and one or more snapshot directories (176A-176N) (also referred to as backup directories). A full backup directory (166) may include, but not limited to, one or more full backup data file images of user asset (126A-126N) data files, one or more clones of full backup data file images of user asset (126A-126N), one or more control files (all not shown).

In one embodiment of the invention, a control file directory may refer to a directory that includes all of the backup control file images associated with an user asset (126A-126N). A control file directory may include any number of backup control file images associated with an user asset (126A-126N) that are also associated with particular point in time.

In one embodiment of the invention, an archive log directory (170) may refer to a directory that includes all archive log files associated with an user asset (126A-126N). An archive log file directory may include any number of backup archive log file images associated with an user asset (126A-126N) that are also associated with particular point in time.

In one embodiment of the invention, an incremental backup directory (172) may refer to a directory that includes unmerged incremental data file images associated with an user asset (126A-126N). Incremental data file images may be stored in the incremental backup directory before being merged with existing full data file images to generate new full data file images in the data file (working) directory.

In one embodiment of the invention, a data file (working) directory (174) may refer to a directory in which all full backup data file images from the client device are written into and cloned from during backup operations.

In one embodiment of the invention, a snapshot (backup) directory (176A-176N) may refer to a directory in which clones of full backup data file images, control file images, and/or parameter file images are stored. Each snapshot directory (176A-176N) may be used to restore an associated user asset (126A-126N) to a point in time associated with the backup data image files.

While FIG. 1D shows a configuration of components, other backup logical file system (142) configurations may be used without departing from the scope of the invention.

Figure 2A:
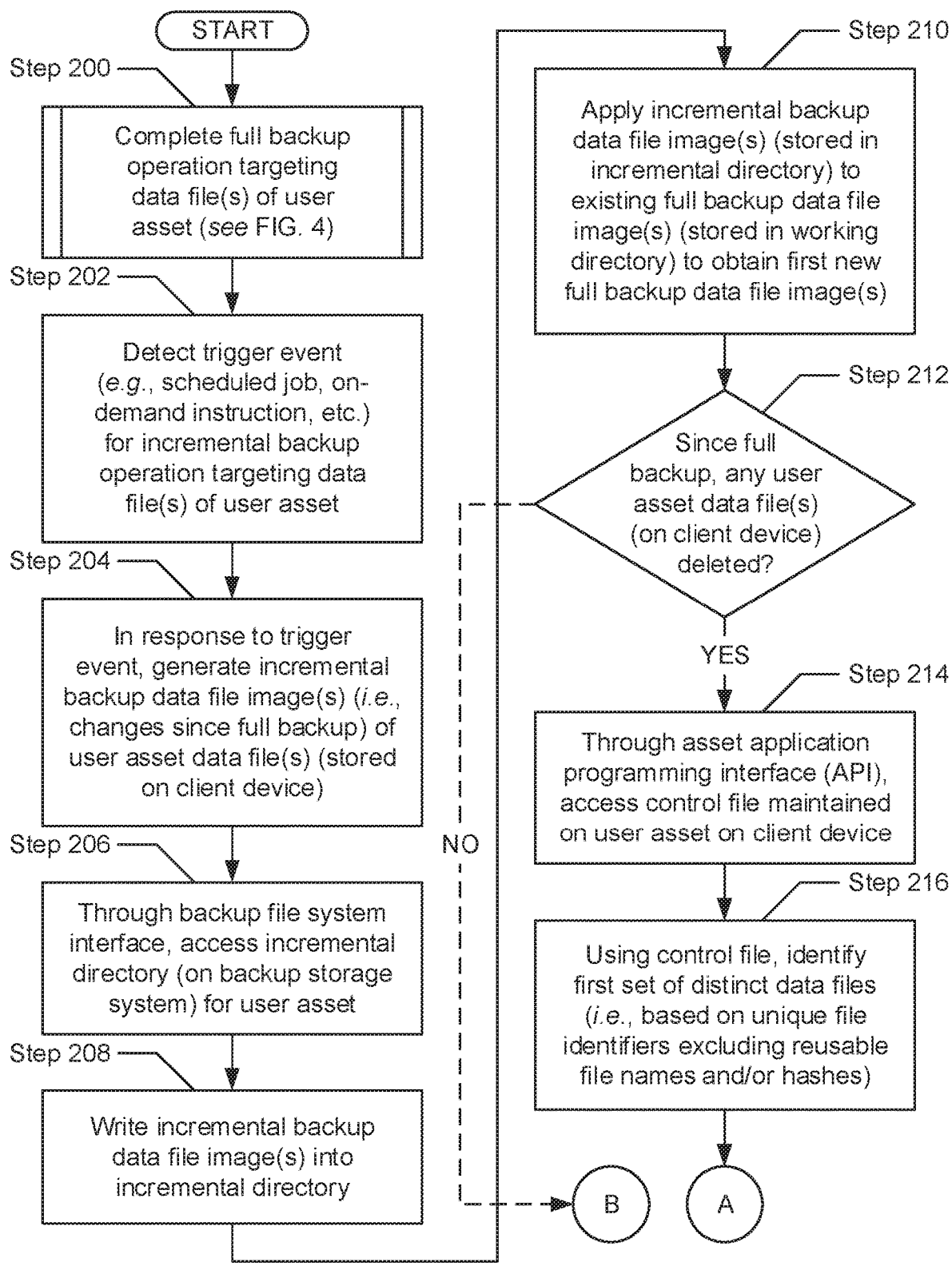
FIGS. 2A and 2B show flowcharts describing a method for adaptively updating database backup operations based on detected data file deletions in accordance with one or more embodiments of the invention.
Figure 2B:
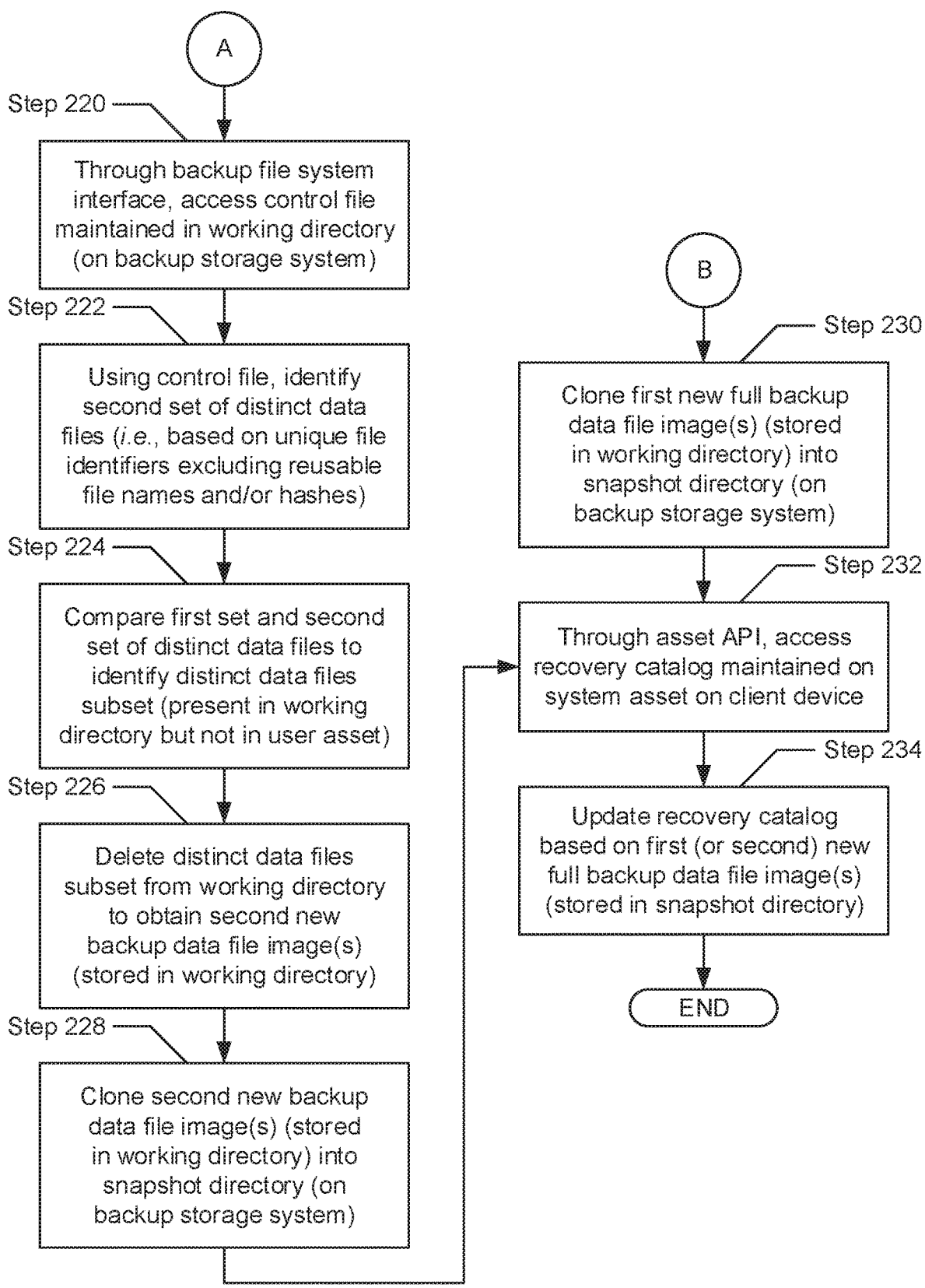

FIGS. 2A and 2B show flowcharts describing a method for adaptively updating database backup operations based on detected data file deletions in accordance with one or more embodiments of the invention. The various steps outlined below may be performed by the client protection agent (see e.g., FIG. 1B). Further, while the various steps in the flowcharts are presented and described sequentially, one or ordinary skill will appreciate that some or all steps may be executed in different orders, may be combined or omitted, and some or all steps may be executed in parallel.

Turning to FIG. 2A, in Step 200, a full backup operation targeting data file(s) of a user asset is completed. In one embodiment of the invention, the performance of a full backup operation may result in one or more full backup data file images present in the data file (i.e., working) directory and stored in a snapshot directory on the backup storage system. Furthermore, upon completion of the full backup operation, a recovery catalog associated with the user asset on the client device may be updated based on the full backup database image(s) stored in the snapshot directory. For additional information regarding the performance of a full backup operation, refer to FIG. 4.

In Step 202, a trigger event for an incremental backup operation targeting a data file(s) of the user asset is detected. In one embodiment of the invention, an incremental backup operation trigger event may be an occurrence that when met, causes the initiation of an incremental backup operation. An incremental backup operation trigger event may be, for example, a scheduled job or an on-demand instruction, or any other event that triggers an incremental backup operation. A scheduled job may be a job that is a part of an incremental backup operation schedule created and maintained by a database administrator. An incremental backup operation schedule may lay out specific points in time an incremental backup operation is to be performed. For example, an incremental backup operation schedule may specify an incremental backup operation be performed twice a day at midnight and noon. An on-demand instruction may specify an instruction to perform an unscheduled incremental backup operation.

In Step 204, in response to the trigger event, an incremental backup data file image(s) of the user asset data file(s) is generated. In one or more embodiments of the invention, the incremental backup data file image(s) may include the changes to the data file(s) since the last incremental or full backup operation. The user asset data file(s) may be stored locally on the client device. Further, the incremental backup data file image(s) may be generated in deduplicated form and, thus, may include an incremental backup content recipe. A content recipe may refer to a sequence of chunk identifiers (or pointers) associated with (or directed to) unique database data chunks indexed in physical storage— e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the incremental backup content recipe may convey a sequence of fingerprints collectively representative of the undeduplicated incremental backup content.

In Step 206, the incremental directory on the backup storage system is accessed through the backup file system interface. In one or more embodiments of the invention, the backup file system interface allows the client device and entities within to access and manipulate directories and files on the backup storage system. The client device or entities on the client device may use an asset directory identifier to identify and access the asset directory associated with the incremental backup operation, and subsequently identify and access the incremental directory. An asset directory identifier may be used to differentiate and access an asset directory from other directories on the backup storage system.

In Step 208, the incremental backup data file image(s) is written into the incremental directory. In one or more embodiments of the invention, the incremental backup data file image(s) may be written into the incremental directory serially or in parallel. Writing incremental backup data file image(s) serially may include writing incremental backup data file images, if there are more than one, one by one. For example, the first incremental backup data file image is written into the incremental directory. After the first incremental backup data file image is successfully written into the incremental directory, then the second incremental backup data file image is written into the incremental directory and so on until all of the incremental backup data file images are successfully written into the incremental directory. Writing incremental backup data file images in parallel may include writing all of the incremental backup data file images into the incremental directory at the same time.

In Step 210, the incremental backup data file image(s) stored in the incremental directory is applied to an existing full backup data file image(s) stored in the working directory to obtain a first new full backup data file image(s). In one embodiment of the invention, the aforementioned application of incremental backup data file image(s) to existing full backup data file image(s) may entail applying any database data changes, recorded in the incremental backup data file image(s), onto the full backup data file image(s), thereby creating a new full backup data file image(s). Further, the new full backup data file image(s) may be retained in deduplicated form, similar to the full backup data file image(s) or the incremental backup data file image(s). Accordingly, the new full backup data file image may include a new full backup content recipe representative of the new full backup content.

In Step 212, a determination is made as to whether, since the full backup, any user asset data file(s) on the client device was deleted. Accordingly, in one embodiment of the invention, if it is determined that one or more data files were deleted from the client device since the full backup, then the method proceeds to Step 214. On the other hand, if it is alternatively determined that no data file(s) were deleted since the full backup, then the method proceeds to Step 230 of FIG. 2B.

In Step 214, following the determination that one or more data files were deleted from the user asset since the previous full backup, a control file maintained on a user asset of the client device is accessed through an asset application programming interface (API). The asset API may enable the client device and/or entities on the client device to access and modify data files on a user asset of the client device as discussed above. Furthermore, the control file may include metadata regarding the user asset and the data files stored within as discussed above.

In Step 216, a first set of distinct data files is identified using the control file. In one embodiment of the invention, the set of distinct data files may be identified using unique file identifiers excluding reusable file names and/or hashes. In one or more embodiments of the invention, the identified first set of distinct data files may include the data files present in the user asset at the time of the incremental backup operation. As mentioned above, the metadata included in the control file may be used to identify the first set of distinct data files. The metadata may include unique global data file identifiers, unique global user asset identifiers, and/or other metadata that can be used to identify the first set of distinct data files. The metadata may not include reusable file names and/or hashes to avoid data corruption and/or data loss due to deleting files that do not require deletion.

Turning to FIG. 2B, in Step 220, a control file maintained in the working directory on the backup storage system is accessed through the backup file system interface. As discussed above, the backup file system interface may allow the client device and/or entities on the client device to access and manipulate files and directories on the backup storage system. Furthermore, the control file may include metadata regarding the data file (i.e., working) directory on the backup storage system and the data files stored within as discussed above.

In Step 222, a second set of distinct data files is identified using the control file. In one embodiment of the invention, the second set of distinct data files may be identified based on unique file identifiers excluding reusable file names and/or hashes. In one or more embodiments of the invention, the identified second set of distinct data files may include the data files present in the working directory at the time of the incremental backup operation. As mentioned above, the metadata included in the control file may be used to identify the second set of distinct data files. The metadata may include unique global data file identifiers, unique global associated user asset identifiers, and/or other metadata that can be used to identify the second set of distinct data files. The metadata may not include reusable file names and/or hashes to avoid data corruption and/or data loss due to deleting files that do not require deletion.

In Step 224, the first and second set of distinct data files are compared to identify a distinct data files subset. In one embodiment of the invention, the distinct data files subset may include data files present in the working directory of the backup storage system deleted from the user asset on the client device since the previous full backup operation. The client protection agent may compare the first and second sets of distinct data files by comparing lists of unique global data file identifiers for each set of distinct data files. All data files included in the second set of distinct data files and not in the first set of distinct data files (i.e., present in the working directory but not in the user asset on the client device) may be included in the distinct data files subset.

In Step 226, the distinct data files subset is deleted from the working directory to obtain a second new backup data file image(s) stored in the working directory. In one embodiment of the invention, the deletion of the distinct data files subset may result in an updated set of full backup data file images in the working directory that reflects the data file(s) currently stored in the user asset on the client device.

In Step 228, the second new backup data file image(s) stored on the working directory is cloned into a snapshot directory on the backup storage system. The second new backup data file image(s) may not include the backup data file image(s) associated with data file(s) that have been deleted from the user asset on the client device since the previous full or incremental backup operation. In one embodiment of the invention, cloning of a given backup data file image may entail generating a pointer-based snapshot of the given backup data file image. That is, rather than cloning or copying the physical database data itself, associated with the given backup data file image, generation of a pointer-based snapshot exercises the cloning or copying of the backup data file image content recipe (described above). Subsequently, the cloning process of any given backup data file image is rapid despite the physical storage space consumed by the associated physical database data; and, further, the cloning process results in the obtaining of a backup data file image copy for each backup data file image, which consumes little to no physical storage capacity. Moreover, in another embodiment of the invention, for each given backup data file image that was cloned, which had been stored in a first directory path (i.e., the working directory), the respective backup data file images may be stored in a second directory path (i.e., the snapshot directory) on the backup storage system. The process may then proceed to Step 232.

Referring back to FIG. 2A, in response to the determination made in Step 212 that no user asset data files have been deleted since the full backup operation, in Step 230 of FIG. 2B, the first new full backup data file image(s) stored in the working directory is/are cloned into the snapshot directory on the backup storage system. The first new full backup data file image(s) may represent all the data files on the user asset that were included in the full backup operation (i.e., no data files were deleted in that time). In one embodiment of the invention, cloning of a given backup data file image may entail generating a pointer-based snapshot of the given backup data file image. That is, rather than cloning or copying the physical database data itself, associated with the given backup data file image, generation of a pointer-based snapshot exercises the cloning or copying of the backup data file image content recipe (described above). Subsequently, the cloning process of any given backup data file image is rapid despite the physical storage space consumed by the associated physical database data; and, further, the cloning process results in the obtaining of a backup data file image copy for each backup data file image, which consumes little to no physical storage capacity as discussed above. Moreover, in another embodiment of the invention, for each given backup data file image that was cloned, which had been stored in a first directory path (i.e., the working directory), the respective backup data file images may be stored in a second directory path (i.e., the snapshot directory) on the backup storage system. The process may then proceed to Step 232.

In Step 232, the recovery catalog maintained on a system asset on the client device is accessed through an asset API. The asset API may enable the client device and/or entities on the client device to access and modify data files on the system asset of the client device as discussed above. Furthermore, the recovery catalog may include metadata regarding backup operations and associated data file images stored in the backup storage system as discussed above.

In Step 234, the recovery catalog is updated based on the first (or second) new full backup data file image(s) stored in the snapshot directory. Updating the recovery catalog may entail informing the client device of the existence of the new full backup data file image(s) generated and stored in the backup storage system during the incremental backup operation. In one embodiment of the invention, the recovery catalog may be updated to include metadata regarding the incremental backup operation and the new full backup data file image(s) included therein. The metadata included in the recovery catalog may be, for example, timestamps encoding dates and/or times during which the new full backup data file image(s) had been stored into the snapshot directory and/or synthesized in the working directory; backup identifiers or names associated with the new full backup data file image(s); a directory path in the backup file system at which the new full backup data file image(s) may be found, etc.

The method may end following Step 234.

Figure 3A:
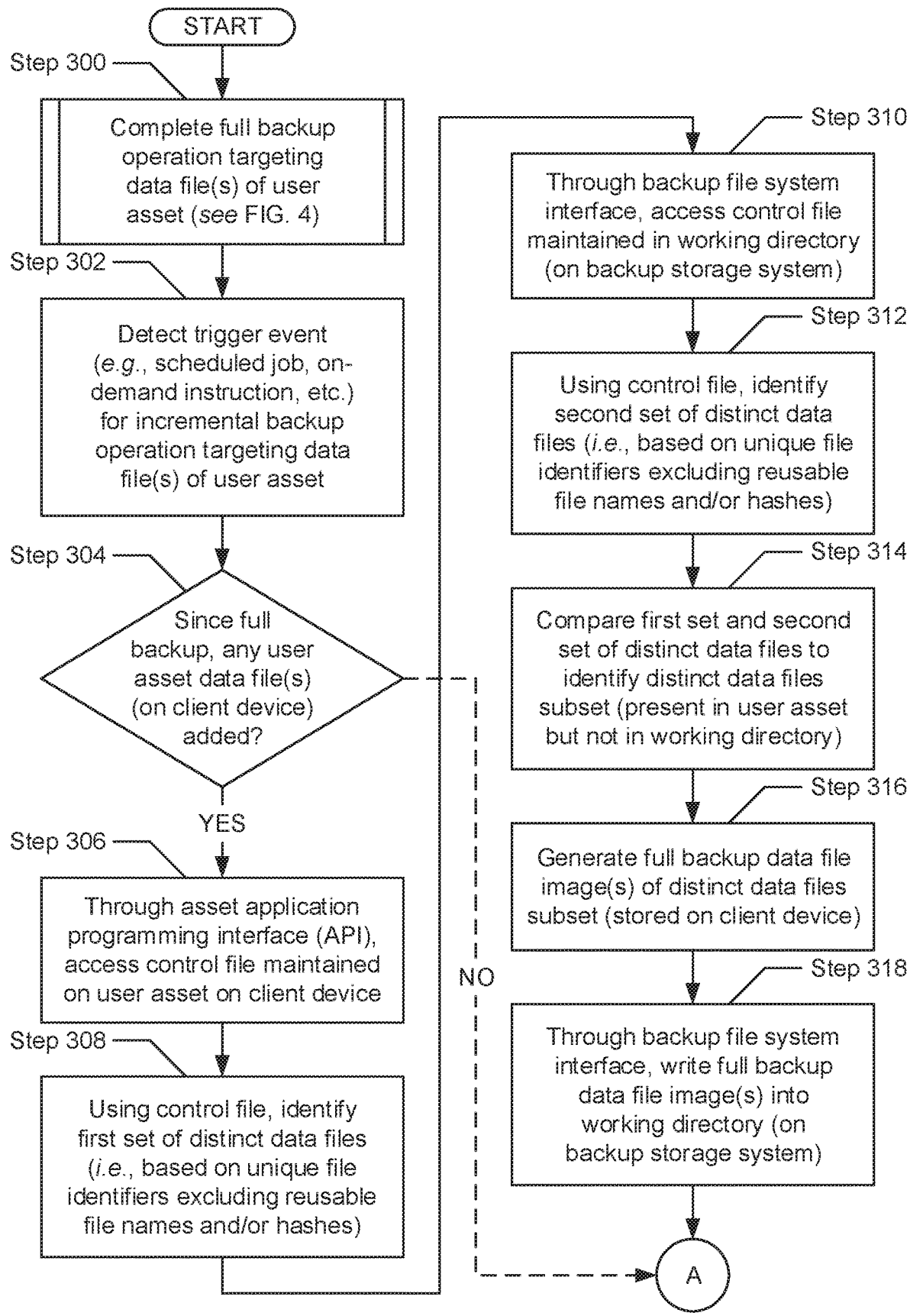
FIGS. 3A and 3B show flowcharts describing a method for adaptively updating database backup operations based on detected data file additions in accordance with one or more embodiments of the invention.
Figure 3B:
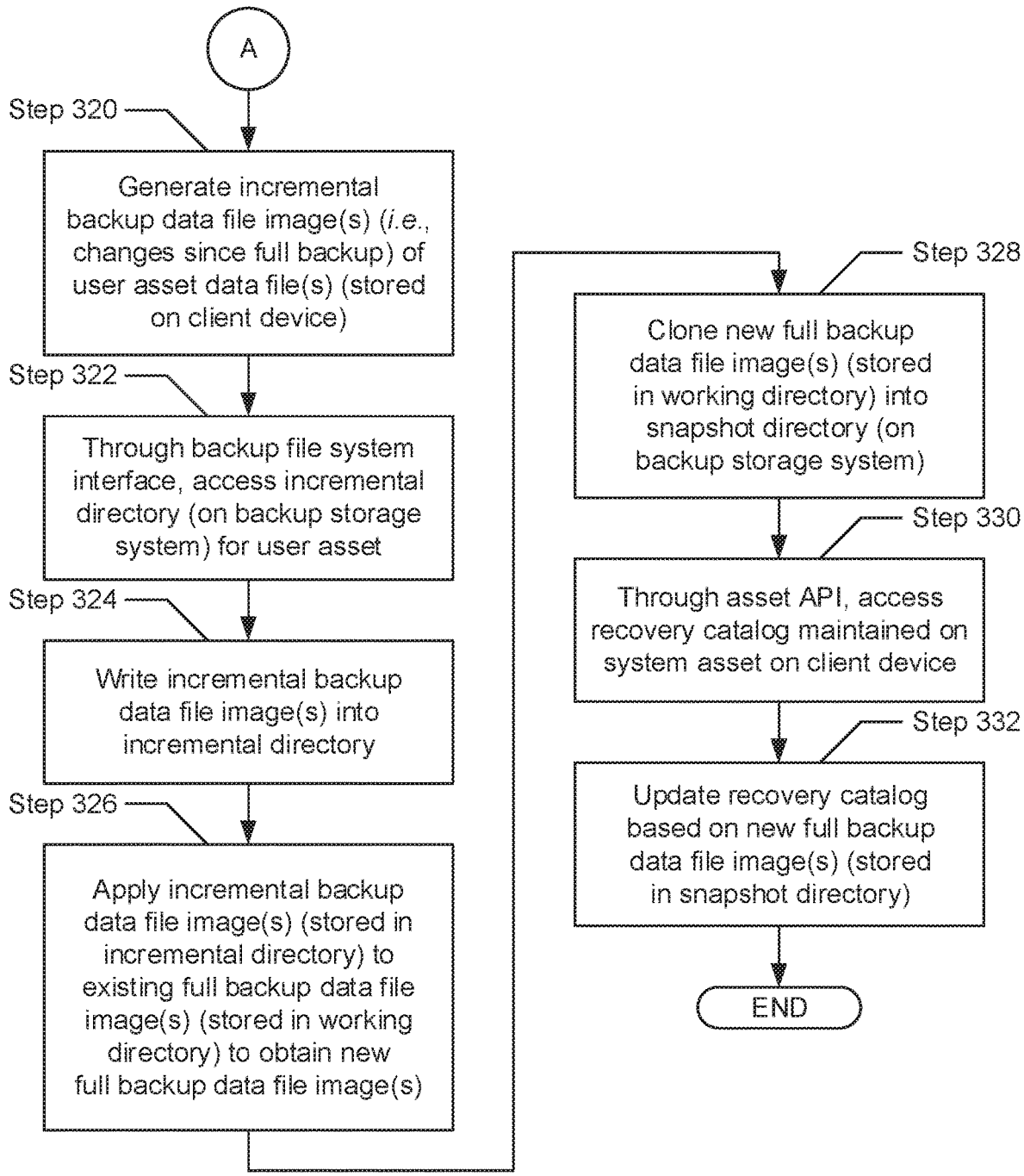

FIGS. 3A and 3B show flowcharts describing a method for adaptively updating database backup operations based on detected data file additions in accordance with one or more embodiments of the invention. The various steps outlined below may be performed by the client protection agent (see e.g., FIG. 1B). Further, while the various steps in the flowcharts are presented and described sequentially, one or ordinary skill will appreciate that some or all steps may be executed in different orders, may be combined or omitted, and some or all steps may be executed in parallel.

Turning to FIG. 3A, in Step 300, a full backup operation targeting data file(s) of a user asset is completed. In one embodiment of the invention, the performance of a full backup operation may result in one or more full backup data file images present in the data file (i.e., working) directory and stored in a snapshot directory on the backup storage system. Furthermore, upon completion of the full backup operation, a recovery catalog associated with the user asset on the client device may be updated based on the full backup database image(s) stored in the snapshot directory. For additional information on completing a full backup operation, refer to FIG. 4.

In Step 302, a trigger event for an incremental backup operation targeting a data file(s) of the user asset is detected. In one or more embodiments of the invention, an incremental backup operation trigger event may be an occurrence that when met, causes the initiation of an incremental backup operation. An incremental backup operation trigger event may be, for example, a scheduled job or an on-demand instruction, or any other event that triggers an incremental backup operation. A scheduled job may be a job that is a part of an incremental backup operation schedule created and maintained by a database administrator. An incremental backup operation schedule may lay out specific points in time an incremental backup operation is to be performed. For example, an incremental backup operation schedule may specify an incremental backup operation be performed twice a day at midnight and noon. An on-demand instruction may specify an instruction to perform an unscheduled incremental backup operation.

In Step 304, a determination is made as to whether, since the full backup, any user asset data file(s) on the client device were added. Accordingly, in one embodiment of the invention, if it is determined that one or more data files were added on the client device since the full backup, then the method proceeds to Step 306. On the other hand, in another embodiment of the invention, if it is alternatively determined that no data file(s) were added on the client device since the full backup, then the method proceeds to Step 320 of FIG. 3B.

In response to the determination made in Step 304 at least one data file was added to the user asset since the full backup operation, in Step 306, a control file maintained on the user asset on the client device is accessed through an asset application programming interface (API). The asset API may enable the client device and/or entities on the client device to access and modify data files on a user asset of the client device as discussed above. Furthermore, the control file may include metadata regarding the user asset and the data files stored within as discussed above.

In Step 308, a first set of distinct data files is identified using the control file. In one embodiment of the invention, the first set of distinct data files is identified based on unique file identifiers excluding reusable file names and/or hashes. In one or more embodiments of the invention, the identified first set of distinct data files may include the data files present in the user asset at the time of the incremental backup operation. As mentioned above, the metadata included in the control file may be used to identify the first set of distinct data files. The metadata may include unique global data file identifiers, unique global user asset identifiers, and/or other metadata that can be used to identify the first set of distinct data files. The metadata may not include reusable file names and/or hashes to avoid data corruption and/or data loss due to adding files that do not require addition.

In Step 310, a control file maintained in the working directory on the backup storage system is accessed through the backup file system interface. As discussed above, the backup file system interface may allow the client device and/or entities on the client device to access and manipulate files and directories on the backup storage system. Furthermore, the control file may include metadata regarding the data file (i.e., working) directory on the backup storage system and the data files stored within as discussed above.

In Step 312, a second set of distinct data files is identified using the control file. In one embodiment of the invention, the second set of distinct data files is identified based on unique file identifiers excluding reusable file names and/or hashes. In one or more embodiments of the invention, the identified second set of distinct data files may include the data files present in the working directory at the time of the incremental backup operation. As mentioned above, the metadata included in the control file may be used to identify the second set of distinct data files. The metadata may include unique global data file identifiers, unique global associated user asset identifiers, and/or other metadata that can be used to identify the second set of distinct data files. The metadata may not include reusable file names and/or hashes to avoid data corruption and/or data loss due to adding files that do not require addition.

In Step 314, the first and second set of distinct data files are compared to identify a distinct data files subset. In one embodiment of the invention, the distinct data files subset may include data files included in the user asset on the client device but not in the working directory on the backup storage system. The client protection agent may compare the first and second sets of distinct data files by comparing lists of unique global data file identifiers for each set of distinct data files. All data files included in the first set of distinct data files and not in the second set of distinct data files (i.e., present in the user asset on the client device but not in working directory) may be included in the distinct data files subset.

In Step 316, a full backup data file image(s) of the distinct data files subset stored on the client device is generated. The full backup data file image(s) may reflect all database data of the for the given distinct data files subset stored on the client device. Further, the full backup data file image(s) may be in deduplicated form and, thus, may include a full backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the full backup content recipe may convey a sequence of fingerprints collectively representative of the undeduplicated full backup content.

In Step 318, the full backup data file image(s) is written into the working directory on the backup storage system through the backup file system interface. In one or more embodiments of the invention, the full backup data file image(s) may be written into the working directory serially or in parallel. Writing full backup data file image(s) serially may include writing full backup data file images, if there are more than one, one by one. For example, the first full backup data file image is written into the working directory. After the first full backup data file image is successfully written into the working directory, then the second full backup data file image is written into the working directory and so on until all of the full backup data file images are successfully written into the working directory. Writing full backup data file images in parallel may include writing all of the full backup data file images into the working directory at the same time. As a result of execution of Step 318, the added data files to the user asset on the client device are included as full backup data file image(s) in the working directory in the backup storage system.

Turning to FIG. 3B, in Step 320, an incremental backup data file image(s) of a user asset data file(s) stored on the client device is generated. In one or more embodiments of the invention, the incremental backup data file image(s) may include the changes to the data file(s) since the last incremental or full backup operation. The user asset data file(s) may be stored locally on the client device. Further, the incremental backup data file image(s) may be generated in deduplicated form and, thus, may include an incremental backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the incremental backup content recipe may convey a sequence of fingerprints collectively representative of the undeduplicated incremental backup content.

In Step 322, an incremental directory for a user asset on the backup storage system is accessed through the backup file system interface. In one or more embodiments of the invention, the backup file system interface allows the client device and entities within to access and manipulate directories and files on the backup storage system. The client device or entities on the client device may use an asset directory identifier to identify and access the asset directory associated with the incremental backup operation, and subsequently identify and access the incremental directory. An asset directory identifier may be used to differentiate and access an asset directory from other directories on the backup storage system.

In Step 324, the incremental backup data file image(s) is written into the incremental directory. In one or more embodiments of the invention, the incremental backup data file image(s) may be written into the incremental directory serially or in parallel. Writing incremental backup data file image(s) serially may include writing incremental backup data file images, if there are more than one, one by one. For example, the first incremental backup data file image is written into the incremental directory. After the first incremental backup data file image is successfully written into the incremental directory, then the second incremental backup data file image is written into the incremental director and so on until all of the incremental backup data file images are successfully written into the incremental directory. Writing incremental backup data file images in parallel may include writing all of the incremental backup data file images into the incremental directory at the same time.

In Step 326, the incremental backup data file image(s) stored in the incremental directory is applied to the existing full backup data file image(s) stored in the working directory to obtain a new full backup data file image(s). The existing full backup data file image(s) includes the full backup data file image(s) generated in FIG. 4 and generated in Step 316. In one embodiment of the invention, the aforementioned application of incremental backup data file image(s) to existing full backup data file image(s) may entail applying any database data changes, recorded in the incremental backup data file image(s), onto the full backup data file image(s), thereby creating a new full backup data file image(s). Further, the new full backup data file image(s) may be retained in deduplicated form, similar to the full backup data file image(s) or the incremental backup data file image(s). Accordingly, the new full backup data file image(s) may include a new full backup content recipe(s) representative of the contents of the new full backup image(s).

In Step 328, the new full backup data file image(s) stored in the working directory is cloned into snapshot directory on the backup storage system. In one embodiment of the invention, cloning of a given backup data file image may entail generating a pointer-based snapshot of the given backup data file image. That is, rather than cloning or copying the physical database data itself, associated with the given backup data file image, generation of a pointer-based snapshot exercises the cloning or copying of the backup data file image content recipe (described above). Subsequently, the cloning process of any given backup data file image is rapid despite the physical storage space consumed by the associated physical database data; and, further, the cloning process results in the obtaining of a backup data file image copy for each backup data file image, which consumes little to no physical storage capacity as discussed above. Moreover, in another embodiment of the invention, for each given backup data file image that was cloned, which had been stored in a first directory path (i.e., the working directory), the respective backup data file images may be stored in a second directory path (i.e., the snapshot directory) on the backup storage system.

In Step 330, the recovery catalog maintained on the system asset on the client device is accessed through the asset API. The asset API may enable the client device and/or entities on the client device to access and modify data files on the system asset of the client device as discussed above. Furthermore, the recovery catalog may include metadata regarding backup operations and associated data file images stored in the backup storage system as discussed above.

In Step 332, the recovery catalog is updated based on the new full backup data file image(s) stored in the snapshot directory. Updating the recovery catalog may entail informing the client device of the existence of the new full backup data file image(s) generated and stored in the backup storage system during the incremental backup operation. In one embodiment of the invention, the recovery catalog may be updated to include metadata regarding the incremental backup operation and the new full backup data file image(s) included therein. The metadata included in the recovery catalog may be, for example, timestamps encoding dates and/or times during which the new full backup data file image(s) had been stored into the snapshot directory and/or synthesized in the working directory; backup identifiers or names associated with the new full backup data file image(s); a directory path in the backup file system at which the new full backup data file image(s) may be found, etc.

The method may end following Step 332.

Figure 4:
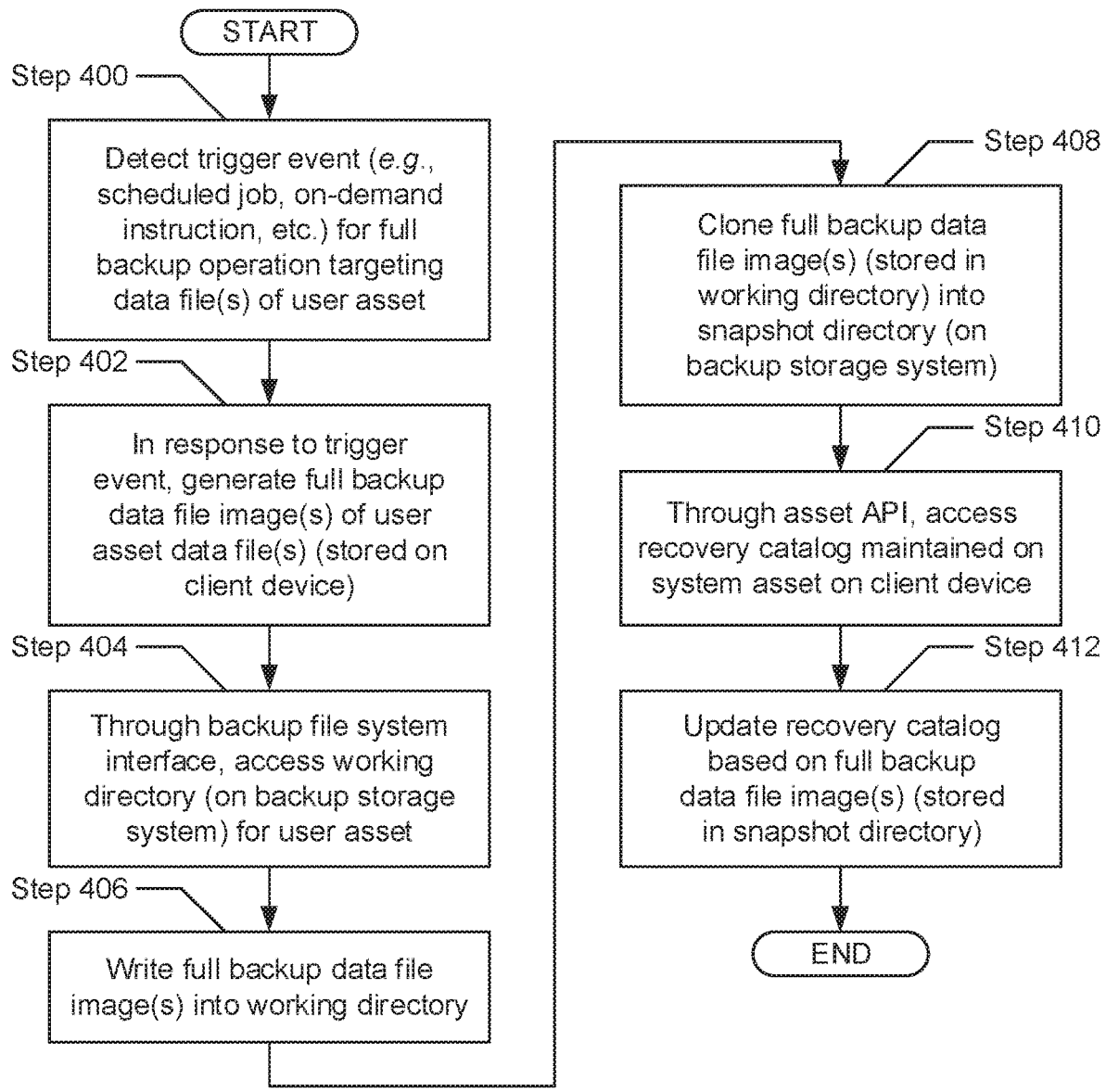
FIG. 4 shows a flowchart describing a method for completing database full backup operations targeting data files in accordance with one or more embodiments of the invention.

FIG. 4 shows a flowchart describing a method for completing database full backup operations targeting data files in accordance with one or more embodiments of the invention. The various steps outlined below may be performed by the client protection agent (see e.g., FIG. 1B). Further, while the various steps in the flowcharts are presented and described sequentially, one or ordinary skill will appreciate that some or all steps may be executed in different orders, may be combined or omitted, and some or all steps may be executed in parallel.

Turning to FIG. 4, in Step 400, a trigger event for a full backup operation targeting data file(s) of a user asset is detected. In one or more embodiments of the invention, an incremental backup operation trigger event may be an occurrence that when met, causes the initiation of an incremental backup operation. An incremental backup operation trigger event may be, for example, a scheduled job or an on-demand instruction, or any other event that triggers an incremental backup operation. A scheduled job may be a job that is a part of an incremental backup operation schedule created and maintained by a database administrator. An incremental backup operation schedule may lay out specific points in time an incremental backup operation is to be performed. For example, an incremental backup operation schedule may specify an incremental backup operation be performed twice a day at midnight and noon. An on-demand instruction may specify an instruction to perform an unscheduled incremental backup operation.

In Step 402, in response to the trigger event, a full backup data file image(s) of a user asset data file(s) stored on the client device is generated. The full backup data file image(s) may reflect all database data for the given data files of the user asset stored on the client device. Further, the full backup data file image(s) may be in deduplicated form and, thus, may include a full backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the full backup content recipe may convey a sequence of fingerprints collectively representative of the undeduplicated full backup content.

In Step 404, a working directory on the backup storage system for the user asset is accessed through the backup file system interface. As discussed above, the backup file system interface may allow the client device and/or entities on the client device to access and manipulate files and directories on the backup storage system.

In Step 406, the full backup data file image(s) is written into the working directory. In one or more embodiments of the invention, the full backup data file image(s) may be written into the working directory serially or in parallel. Writing full backup data file image(s) serially may include writing full backup data file images, if there are more than one, one by one. For example, the first full backup data file image is written into the working directory. After the first full backup data file image is successfully written into the working directory, then the second full backup data file image is written into the working directory and so on until all of the full backup data file images are successfully written into the working directory. Writing full backup data file images in parallel may include writing all of the full backup data file images into the working directory at the same time.

In Step 408, the full backup data file image(s) stored in the working directory is cloned into a snapshot directory on the backup storage system. The full backup data file image(s) may represent all the data files on the user asset that were included in the full backup operation (i.e., no data files were deleted in that time). In one embodiment of the invention, cloning of a given backup data file image may entail generating a pointer-based snapshot of the given backup data file image. That is, rather than cloning or copying the physical database data itself, associated with the given backup data file image, generation of a pointer-based snapshot exercises the cloning or copying of the backup data file image content recipe (described above). Subsequently, the cloning process of any given backup data file image is rapid despite the physical storage space consumed by the associated physical database data; and, further, the cloning process results in the obtaining of a backup data file image copy for each backup data file image, which consumes little to no physical storage capacity as discussed above. Moreover, in another embodiment of the invention, for each given backup data file image that was cloned, which had been stored in a first directory path (i.e., the working directory), the respective backup data file images may be stored in a second directory path (i.e., the snapshot directory) on the backup storage system.

In Step 410, a recovery catalog maintained on a system asset on the client device is accessed through an asset API. The asset API may enable the client device and/or entities on the client device to access and modify data files on the system asset of the client device as discussed above. Furthermore, the recovery catalog may include metadata regarding backup operations and associated data file images stored in the backup storage system as discussed above.

In Step 412, the recovery catalog is updated based on the full backup data file image(s) stored in the snapshot directory. Updating the recovery catalog may entail informing the client device of the existence of the full backup data file image(s) generated and stored in the backup storage system during the incremental backup operation. In one embodiment of the invention, the recovery catalog may be updated to include metadata regarding the incremental backup operation and the new full backup data file image(s) included therein. The metadata included in the recovery catalog may be, for example, timestamps encoding dates and/or times during which the full backup data file image(s) had been stored into the snapshot directory and/or synthesized in the working directory; backup identifiers or names associated with the full backup data file image(s); a directory path in the backup file system at which the full backup data file image(s) may be found, etc.

The method may end following Step 412.

Figure 5:
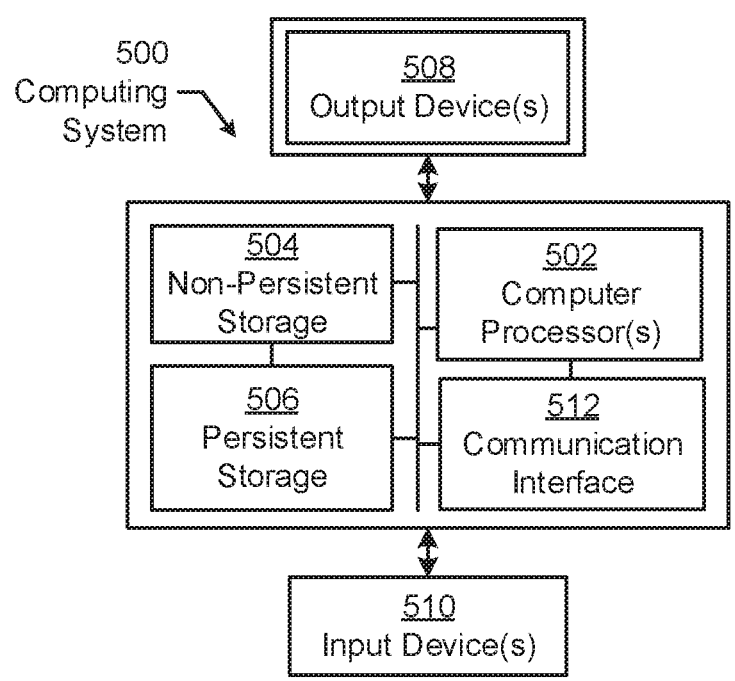
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, comprising:
    generating a full backup of a user asset at a first point in time;
    generating an incremental backup after the full backup is generated;
    applying the incremental backup to the full backup to generate a second full backup;
    making a determination that a portion of data files included in the user asset was deleted after the generation of the full backup;
    in response to the determination:
    identifying a first set of distinct data files using a first control file associated with the user asset, wherein the first control file specifies the data files included in the user asset;
    identifying a second set of distinct data files using a second control file associated with the second full backup, wherein the second control file specifies data files included in the second full backup;
    obtaining a distinct data files subset associated with the second full backup by comparing the first set of distinct data files and the second set of distinct data files, wherein the distinct data files subset specifies the portion of the data files;
    deleting the distinct data files subset from the second full backup to obtain a third full backup; wherein the incremental backup is stored in an incremental directory on a backup storage and wherein the third full backup is stored in a working directory;
    cloning the third full backup to generate a set of pointers to data in the third full backup; and
    storing the set of pointers in a snapshot directory, wherein a recovery catalogue is updated using the set of pointers.

2. The method of claim 1, further comprising:
    generating a fourth full backup of the user asset at a second point in time;
    obtaining a second distinct data files subset associated with the fourth full backup;
    generating a fifth full backup of the second distinct data files subset;
    applying the fifth full backup to the fourth full backup to generate a sixth full backup;
    generating a second incremental backup after the sixth full backup is generated; and
    applying the second incremental backup to the sixth full backup to generate a seventh full backup.

3. The method of claim 2, wherein the second distinct data files subset specifies files added to the user asset since the fourth full backup.

4. A system, comprising:
    a client device comprising a client storage array, wherein the client storage array comprises a user asset;
    a computer processor of the client device, wherein the computer processor is configured to:
    generate a full backup of the user asset at a first point in time;
    generate an incremental backup after the full backup is generated;
    apply the incremental backup to the full backup to generate a second full backup;
    make a determination that a portion of data files data files included in the user asset was deleted after the generation of the full backup;
    in response to the determination:
    identify a first set of distinct data files using a first control file associated with the user asset, wherein the first control file specifies the data files included in the user asset;
    identify a second set of distinct data files using a second control file associated with the second full backup, wherein the second control file specifies data files included in the second full backup;
    obtain a distinct data files subset associated with the second full backup by comparing the first set of distinct data files and the second set of distinct data files, wherein the distinct data files subset specifies the portion of the data files;

deleting the distinct data files subset from the second full backup to obtain a third full backup; wherein the incremental backup is stored in an incremental directory on a backup storage and wherein the third full backup is stored in a working directory;

clone the third full backup to generate a set of pointers to data in the third full backup; and store the set of pointers in a snapshot directory, wherein a recovery catalogue is updated using the set of pointers.

5. The system of claim 4, wherein the computer processor is further configured to:

generate a fourth full backup of the user asset at a second point in time;

obtain a second distinct data files subset associated with the fourth full backup;

generate a fifth full backup of the second distinct data files subset;

apply the fifth full backup to the fourth full backup to generate a sixth full backup;

generate a second incremental backup after the sixth full backup is generated; and apply the second incremental backup to the sixth full backup to generate a seventh full backup.

6. The system of claim 5, wherein the second distinct data files subset specifies files added to the user asset since the fourth full backup.

7. A non-transitory computer readable medium comprising computer readable program code, which when executed by a computer processor enables the computer processor to perform a method, the method comprising:

generating a full backup of a user asset at a first point in time;

generating an incremental backup after the full backup is generated;

applying the incremental backup to the full backup to generate a second full backup;

making a determination that a portion of data files included in the user asset was deleted after the generation of the full backup;

in response to the determination:

identifying a first set of distinct data files using a first control file associated with the user asset, wherein the first control file specifies the data files included in the user asset;

identifying a second set of distinct data files using a second control file associated with the second full backup, wherein the second control file specifies data files included in the second full backup;

obtaining a distinct data files subset associated with the second full backup by comparing the first set of distinct data files and the second set of distinct data files, wherein the distinct data files subset specifies the portion of the data files;

deleting the distinct data files subset from the second full backup to obtain a third full backup; wherein the incremental backup is stored in an incremental directory on a backup storage and wherein the third full backup is stored in a working directory;

cloning the third full backup to generate a set of pointers to data in the third full backup; and storing the set of pointers in a snapshot directory, wherein a recovery catalogue is updated using the set of pointers.

8. The non-transitory computer readable medium of claim 7, wherein the method further comprising:

generating a fourth full backup of the user asset at a second point in time;

obtaining a second distinct data files subset associated with the fourth full backup;

generating a fifth full backup of the second distinct data files subset;

applying the fifth full backup to the fourth full backup to generate a sixth full backup;

generating a second incremental backup after the sixth full backup is generated; and applying the second incremental backup to the sixth full backup to generate a seventh full backup.

* * * * *